United States Patent [19]

Hayashi

[11] 4,012,318

[45] Mar. 15, 1977

[54] METHOD FOR THE RECYCLE TREATMENT OF WASTE WATER FROM CHROMIUM PLATING

[75] Inventor: Toshio Hayashi, Inuyama, Japan

[73] Assignee: Kayabakoyo-Kabushiki-Kaisha, Tokyo, Japan

[22] Filed: Mar. 31, 1975

[21] Appl. No.: 563,729

Related U.S. Application Data

[63] Continuation of Ser. No. 398,602, Sept. 19, 1973, abandoned.

[30] Foreign Application Priority Data

Sept. 22, 1972 Japan .............................. 47-95535
Sept. 22, 1972 Japan .............................. 47-95536
Sept. 22, 1972 Japan .............................. 47-95537

[52] U.S. Cl. .............................. 210/28; 210/37 B
[51] Int. Cl.$^2$ .................. C02B 1/20; C02B 1/42; C02B 1/56
[58] Field of Search .......... 75/101 BE; 210/27, 28, 210/30, 32, 37 M, 38 B, 50, 34; 423/54, 595, 597, 607

[56] References Cited

UNITED STATES PATENTS

| | | | |
|---|---|---|---|
| 3,575,854 | 4/1971 | Richards | 210/50 |
| 3,642,616 | 2/1972 | Burns | 210/32 |
| 3,658,470 | 4/1972 | Zievers et al. | 210/37 M |
| 3,664,950 | 5/1972 | Saraceno et al. | 210/37 M |
| 3,736,253 | 5/1973 | DeAngelis et al. | 210/28 |

*Primary Examiner*—Charles N. Hart
*Assistant Examiner*—Ivars Cintins
*Attorney, Agent, or Firm*—Saul Jecies

[57] ABSTRACT

A method for the recycle treatment of chromium plating waste water, in the process of treating chromium plating waste water obtained by washing the chromium plated products with ion exchange resins, wherein, for the purposes of improving the rate of recovery of chromic acid, of extending the life of the ion exchange resins, and of preventing the formation of sludge, the chromium plating waste water is adjusted almost to neutrality by the addition of an alkaline substance so as to precipitate the metal components contained therein in the form of hydroxides, which are then removed by filtration; the filtrate so obtained is kept neutral during the subsequent treatment for the removal of alkaline components by adsorption in a pretreatment tower packed with cation exchange resins; the dilute dichromic acid solution so obtained is similarly treated for concentration in an adsorption tower packed with anion exchange resins and a purification tower packed with cation exchange resins so as to recover pure dichromic acid solution, whereas the above pretreatment tower and purification tower are regenerated by treatment with sulfuric acid.

19 Claims, 6 Drawing Figures

METHOD FOR THE RECYCLE TREATMENT OF WASTE WATER FROM CHROMIUM PLATING

This is a continuation of application Ser. No. 398,602 filed Sept. 19, 1973, now abandoned.

BACKGROUND OF THE INVENTION

The present invention relates to a method for the recovery of the chromic acid component from the chromium plating waste water obtained by washing chromium plated products and also relates to a method of treatment for converting the chromium plating waste water into an innocuous solution.

In general, in methods for the treatment of chromium plating waste water with the aid of ion exchange resins, mainly direct ion exchange resin processes have been widely employed to date. In those processes, suspended substances are first removed by means of a filter, and the filtrate is allowed to pass through a cation exchange resin tower for adsorption and removal of the cationic components and is then allowed to pass through an anion exchange resin tower for adsorption on the dichromic acid ions; when the anion exchange resin is saturated, the dichromic acid ions are desorbed with sodium hydroxide in the form of sodium chromate solution, which is then treated in the cation exchange resin tower so as to remove the sodium ions and thereby recover dichromic acid liquor. In such processes, however, thorough adsorptive removal of cationic components in the pretreatment with the first cation exchange resins does not occur, and thus, some metallic components are deposited on the resins during the course of the subsequent treatment with anion exchange resins, which impairs the ion exchange efficiency of the resins due to clogging and also impairs the flow rate, to mention only a few of the drawbacks.

The present inventors have thus devised a so-called neutralization type ion exchange resin process to eliminate the drawbacks described above. In this process, an alkaline component is first added to the chromium plating waste water until it is almost neutral so as to convert all the metallic components contained therein into hydroxides, which are then removed by filtration; the filtrate so obtained is then acidified by the addition of dilute sulfuric acid and is allowed to pass through an anion exchange resin tower to adsorb dichromic acid ions; when the resin is saturated, the dichromic acid ions are desorbed in the form of sodium chromate by the use of a sodium hydroxide solution; further, the solution is treated in a cation exchange resin tower for the removal of sodium ions in order to recover dichromic acid liquor. Detailed studies by the present inventors, however, have proved that, in such processes, in the step of adsorbing dichromic acid ions in the anion exchange resin tower, from filtrate which has been acidified by the addition of dilute sulfuric acid (the purpose of acidifying the filtrate is to improve the absorbing power of the anion exchange resins for chromium acid), the sulfuric acid ions are also adsorbed on the anion exchange resins and the dichromic acid liquor finally obtained contains a large amount of sulfuric acid, thus making the recycling of the liquor as such as a plating solution unfeasible. In order to make the recycling of the liquor as a plating solution possible, the sulfuric acid component has to be removed by the use of calcium hydroxide or barium hydroxide, but full removal of the sulfuric acid component is not effected by calcium hydroxide and the extremely high price of barium hydroxide means that its use for the treatment of the waste water is not feasible from an economic standpoint. It is thus desirable to establish a method for the recycle treatment of chromium plating waste water, wherein the step of removal of the sulfuric acid component has been eliminated.

SUMMARY OF THE INVENTION

The purpose of this invention is to provide an improved method for the recycle treatment of chromium plating waste water, whereby the difficulties described previously are overcome. Thus, in the method of the present invention, sodium hydroxide or calcium hydroxide is added to the chromium plating waste water until it is almost neutral so as to convert the iron and other metallic components contained therein completely into the hydroxide forms, which are then removed by filtration; the filtrate, while being kept neutral, is passed through a cation resin bed to adsorb the sodium or calcium, so as to obtain a dilute dichromic acid solution, which is then passed through an anion resin bed so as to adsorb the dichromic acid component; when saturated, the dichromic acid component is desorbed with sodium hydroxide so as to obtain a concentrated sodium chromate solution, which is subsequently passed through a cation resin bed to remove the sodium component, and a pure dichromic acid solution is recovered. On the other hand, each of the cation resin beds described above is regenerated by the use of sulfuric acid, and the waste water from each of the beds is converted into the innocuous form of sodium sulfate solution, which may be recycled for washing the plated products or discarded into rivers.

The present invention, as described, is characterized particularly by the treatment, under neutral conditions, of the chromium plating waste water, from which the iron and other metallic components have been removed by the addition of sodium hydroxide or calcium hydroxide followed by precipitation, and by the subsequent adsorption of sodium or calcium with cation resins, before the adsorption of dichromic acid ions on the anion resins; through such treatments, the exchange efficiency of the resins is evidently improved, and the direct recycling of the dichromic acid solution as obtained at the end of the process as a plating solution is made possible because of its purity.

The above-described and other purposes, characteristic features, and capabilities of the present invention will be fully understood based on the examples described below in the light of the attached figures.

DESCRIPTION OF THE PREFERRED EMBODIMENT

Figure 1:
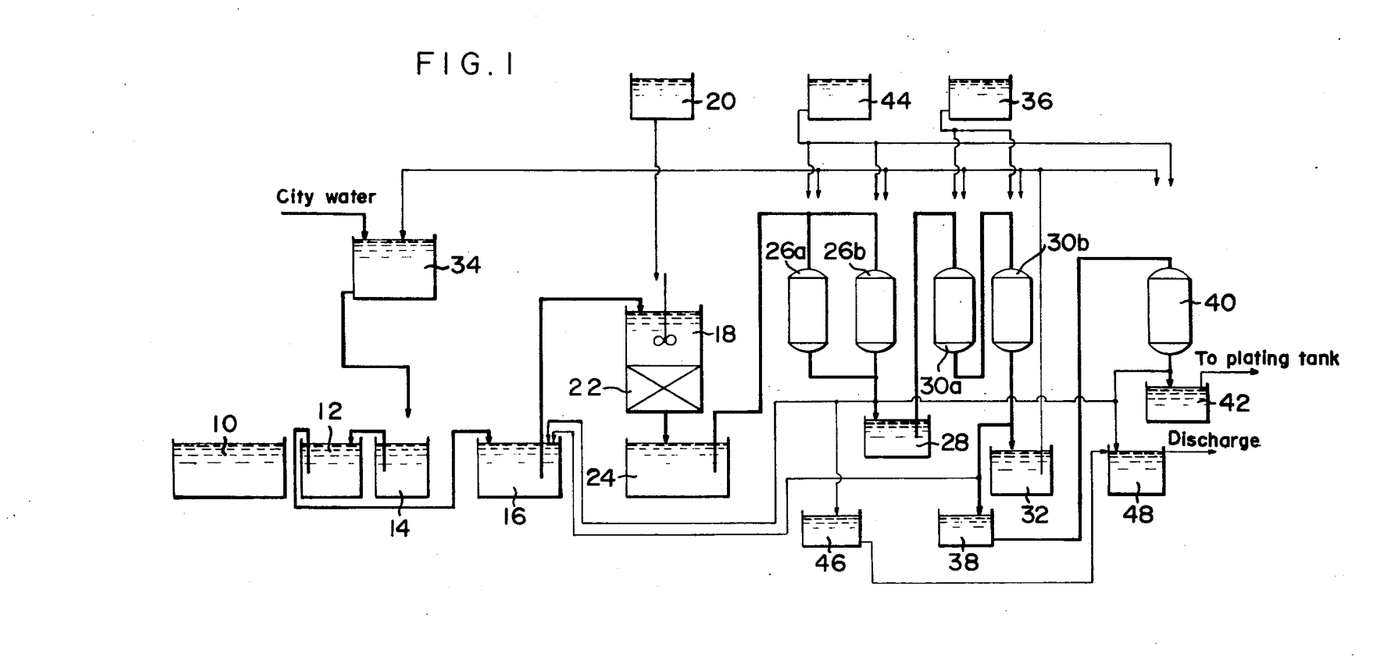
FIG. 1 represents a flow diagram according to the present invention for the recycle treatment of chromium plating waste water.

FIG. 1 schematically illustrates a process for the recycle treatment of chromium plating waste water according to the present invention. Thus, the chromium plated products in the plating tank 10 are first washed with water in the primary washing tank 12 and again washed with water in the secondary washing tank 14. The water used for washing the products is first sent to the secondary washing tank 14, the washing water which has become rich in chromic acid in the secondary washing tank 14 is then transferred into the primary washing tank 12, and the washing water which has become even richer in chromic acid in the primary washing tank 12 is then sent to the storage tank 16 for storage. In general, the chromium plating waste water in this storage tank 16 is acidic, with a pH value of 2.3–3.

The chromium plating waste water stored in the above-mentioned storage tank 16 is transferred into the neutralization tank 18, where an aqueous sodium hydroxide solution is added for neutralization from the sodium hydroxide tank 20 to adjust the pH value to almost neutral, or pH 7–9, in order to precipitate out the iron, copper and other metallic components in the form of their hydroxides. The mixture is passed through the filter 22 positioned below the tank 18, and the filtrate is transferred into the filtrate tank 24. Through such treatments, the metal ions in the chromium plating waste water are replaced by sodium ions, which hardly contaminate the cation and anion resins.

The filtrate in the filtrate tank 24 is, while being kept almost at neutrality, or pH 7–8, then allowed to pass through the pretreatment towers 26a and 26b packed with cation exchange resins to remove sodium ions by adsorption so as to obtain a dilute dichromic acid solution, which is temporarily stored in the buffer tank 28. The purpose of lowering the pH value in the dilute dichromic acid solution and removing the sodium ions from the filtrate in the filtrate tank 24 by adsorption over cation resins is to improve the adsorption efficiency of the subsequently used anion resins for chromic acid ions; in particular, when the pH value is below 3.5, the chromic acid ion is changed from the mono-form, $CrO_4^{--}$, to the di-form, $Cr_2O_7^{--}$, and thus the adsorption efficiency of the anion resins is improved by about 30%.

While the pH is kept acidic, below 3.5, the dilute dichromic acid solution in the above buffer tank 28 is allowed to pass through adsorption towers 30a and 30b packed with anion resins so as to remove the dichromic acid ions, and the effluent from the adsorption towers 30a and 30b is stored in the primary water recovery tank 32. The treated water stored in the primary water recovery tank 32 has thus become an innocuous liquid and can be re-used as washing water again via the secondary water recovery tank 34.

When the adsorption capacity of the above adsorption towers 30a and 30b has been reached, the following operations are performed 1. Purging: The water remaining on the anion resin particles is first blown out by passing air over them.
2. Pre-washing: The resins are then washed by passing about 20 volumes of water per volume of resins downwardly and upwardly through the latter. As washing water, the recycled water in the primary water recovery tank 32 is used.
3. Purging: Air is again passed through the resins so as to purge the water remaining among the resin particles, and all such water as well as the washing water is returned to the storage tank 16.
4. Reagent injection: An amount of aqueous sodium hydroxide solution equivalent to the amount of resin is injected from the caustic soda tank 36 per volume of the resins so as to desorb the dichromic acid ions adsorbed on the anion resins in the form of a sodium chromate solution.
5. Purging: Air is then blown in so as to purge the sodium chromate solution remaining on the resin particles and all of the solution is transferred into and stored in the primary solution recovery tank 38.
6. After-wash: In a manner similar to that described above for the pre-washing, the resins are washed by passing about 20 volumes of the treated liquid stored in the primary water recovery tank 32, per volume of resins upwardly and downwardly through the latter.
7. Purging: Air is then blown in so as to purge the water remaining on the resin particles, and the washing water as well as this water is returned to the storage tank 16.
8. Water filling: Water is then added up to a level just sufficient to cover the resin beds in the adsorption towers 30a and 30b.

Through the treatments described above, the dichromic acid ions adsorbed on the anion resins are removed in the form of sodium chromate solution and admitted into the primary solution recovery tank 38, and at the same time, the anion resins are washed so as to regenerate the adsorption towers 30a and 30b.

Then, the sodium chromate solution in the primary solution recovery tank 38 is fed into the purification tower 40 packed with cation resins, in a manner similar to that described for the above pretreatment towers 26a and 26b, so as to obtain pure dichromic acid solution by adsorption of the sodium ions, and this dichromic acid solution is then transferred into the secondary solution recovery tank 42 and again used as a plating solution in the plating tank 10.

Further, when the adsorption capacities of the above pretreatment towers 26a and 26b and the purification tower 40 are reached, the following operations are performed, as in the case of the adsorption towers 30a and 30b previously described;

1. Purging: Air is blown in so as to purge the dichromic acid solution remaining on the cation resin particles.
2. Pre-wash: About 20 volumes of water per volume of the cation resins are then passed upwardly and downwardly through the latter for washing. As the washing water, the treated solution in the previously described primary solution recovery tank 32 is utilized.
3. Purging: Again, air is blown in so as to purge the washing water remaining on the resin particles, and all of the above dichromic acid solution and the washing water is returned to the above tank 16.
4. Reagent injection: A volume of sulfuric acid equivalent to the amount of resin is supplied from the sulfuric acid tank 44 so as to desorb the sodium ions adsorbed on the cation resins and is removed in the form of innocuous sodium sulfate solution.

5. Purging: Air is then blown in so as to purge the sodium sulfate solution remaining on the resin particles.
6. After-wash: As in the pre-wash, about 20 volumes of the treated solution in the primary water recovery tank 32 is used for the upward and downward washing of the resins.
7. Purging: Air is then blown in so as to purge the washing water remaining on the resin particles, and the sodium sulfate solution and the washing water are stored in the waste sulfuric acid tank 46; this is discarded after adjusting the pH value in the pH control tank 48.
8. Water filling: Water is then added to the pretreatment towers 26a and 26b and the purification tower 40 to a level just sufficient to cover the resins.

Through the treatment described above, sodium ions adsorbed on the cation resins are recovered in the form of sodium sulfate solution, and the pretreatment towers 26a and 26b and the purification tower 40 are regenerated through washing of the cation resins.

In the example shown in FIG. 1, two of the pretreatment towers 26a and 26b are installed in parallel in order to make continuous operation possible by using one for adsorption while the other is being regenerated. The reactions in these pretreatment towers 26a 26b, adsorption towers 30a and 30b, and purification tower 40 are shown below, the resin moiety being expressed as R.

chromic acid by the adsorption of sodium ions. Ten l. of this dichromic acid solution was further passed through the adsorption tower containing 50 ml. anion resins at a speed of 1.5 l./h. so as to obtain innocuous treated water by the removal of chromic acid. The above adsorption tower was regenerated by using 50 ml. of sodium hydroxide solution, the concentration of which was 150 g./l., so as to obtain the chromic acid solution, 20 ml. of which was further passed through the purification tower containing 50 ml. cation resins at a speed of 0.15 l./h. so as to recover concentrated dichromic acid solution by the adsorption of sodium ions on the resins. The concentration of the chromic acid in the resulting dichromic acid solution was found to be 80 g./l. and the sulfuric acid component was essentially undetectable. The pretreatment and purification towers were regenerated by using about one volume of sulfuric acid per volume of the resins. The chemical compositions of the solutions in each of the steps are shown in the following table.

|  | After treatment with sodium hydroxide | After passing through the pretreatment tower | After regeneration of the adsorption tower | After passing through the purification tower |
|---|---|---|---|---|
| $CrO_3$ | 500 ppm | 500 ppm | 80 g./l. | 72 g./l. |
| $H_2SO_4$ | Trace | Trace | 2 g./l. | 1.8 g./l. |
| $Na_2SiF_6$ | 0 | 0 | 0 | 0 |
| Fe | 0 | 0 | 0 | 0 |
| Suspended substances | 0 | 0 | 0 | 0 |
| NaOH | 300 ppm | 10–20 ppm | 150 g./l. | 2–3 g./l. |

As is evident from the above results, according to the process described above, the chromic acid component can be completely recovered from the chromium plating waste water used for washing the chromium plated products, and further, the purity of the resulting dichromic acid solution is high enough for recycling as a plating liquor.

Figure 2:
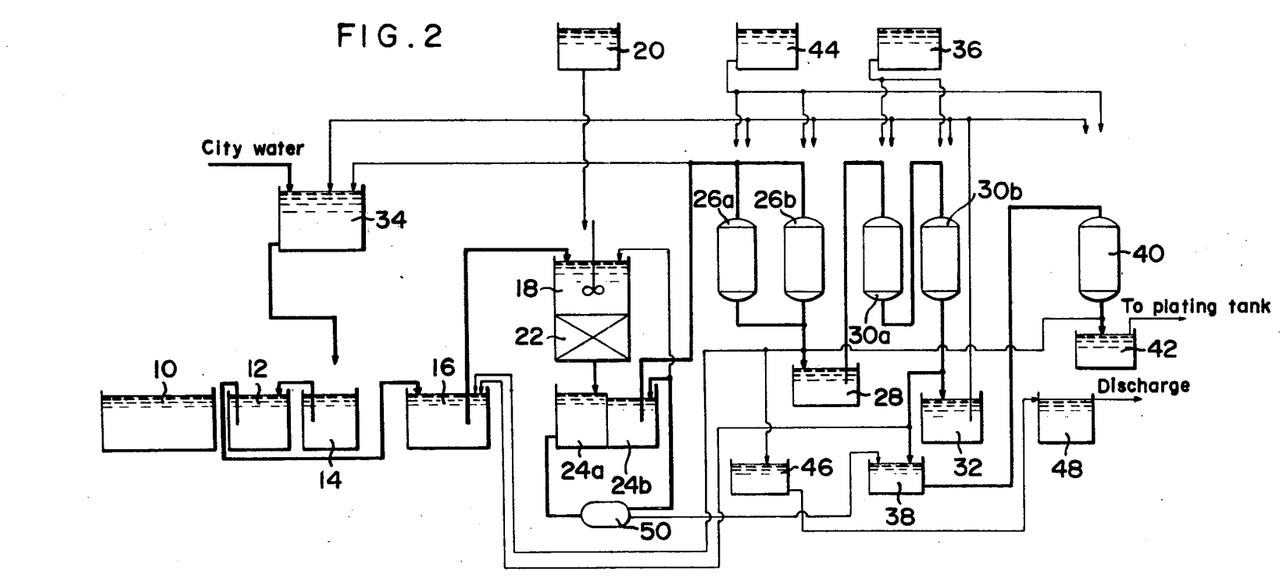
FIG. 2 represents a flow diagram for another embodiment of the invention.

The example shown in FIG. 2 differs from that shown in the above FIG. 1 only in that the filtrate tank is divided into the primary filtrate tank 24a and the sec-

| | |
|---|---|
| Pretreatment tower : | $2R-H + Na_2Cr_2O_7 \longrightarrow 2R-Na + H_2Cr_2O_7$ |
| Adsorption tower : | $2R-OH + H_2Cr_2O_7 \longrightarrow R_2-Cr_2O_7 + 2H_2O$ |
| Adsorption tower (regeneration) : | $R_2-Cr_2O_7 + 2NaOH \longrightarrow 2R-OH + Na_2Cr_2O_7$ |
| Purification tower : | $2R-H + Na_2Cr_2O_7 \longrightarrow 2R-Na + H_2Cr_2O_7$ |
| Regeneration of pretreatment and purification towers: | $2R-Na + H_2SO_4 \longrightarrow 2R-H + Na_2SO_4$ |

Actual examples conducted by the present inventors based on the above principles will be presented below.

EXAMPLE

To 20 l. of chromium plating waste water containing chromic acid at a level of 500 ppm there was added 6 g. of aqueous sodium hydroxide solution, the mixture stirred and adjusted to almost neutrality so as to effect thorough precipitation of iron and other metallic components in the form of hydroxides, and the precipitates separated using the filter. Nine l. of the filtrate so obtained was passed through the pretreatment tower containing 50 ml. cation resins at a speed of 1.5 l./h. so as to obtain dichromic acid solution containing 500 ppm ondary filtrate tank 24b and a supplementary cylinder 50 packed with strongly basic anion resins is used. In the process described in the first example, when the chromic acid concentration in the chromium plating waste water is high and the volume of the waste water is large, an extremely large volume of ion exchange resins is needed, thus requiring a large space for installation and considerable installation cost, which poses a problem for the economic standpoint; further, thorough water washing is essential before and after the regeneration treatment in order to maintain the full activities of the resins, thus requiring a long water washing time.

Thus, in the process described in the example shown in FIG. 2, the filtrate from the filter 22 is first transferred into the primary filtrate tank 24a, treated in the supplementary cylinder 50 packed with strongly basic anion resins of the OH type to remove the chromic acid ions by adsorption, and then transferred into the secondary filtrate tank 24b; further, while this supplementary cylinder 50 is being used for adsorption, the solution in the above secondary filtrate tank 24b is drawn into the secondary water recovery tank 34 to be used as washing water. As soon as chromic acid ions start to leak out from the supplementary cylinder 50, it is switched into the regeneration system, and at the same time, the filtrate in the primary filtrate tank 24a is allowed to overflow into the secondary filtrate tank 24b; further, during the process of regenerating this supplementary cylinder 50, the solution in the secondary filtrate tank 24b is allowed to pass through the pretreatment tower side 26a and 26b for treatment as described in the first example for the recovery of chromic acid. On the other hand, regeneration of the supplementary cylinder 50 is effected by using an aqueous sodium hydroxide solution with a concentration of 100 g./l. or 150 g./l.; further, in the process of resin regeneration, the pre-washing and after-washing are omitted, and only purging-reagent injection treatments are applied before allowing the solution to flow. Also, the regeneration effluent from the supplementary cylinder 50 is transferred into the primary solution recovery tank 38 and further into the purification tower 40 containing cation resins together with the regeneration effluent from the adsorption towers 30a and 30b for the adsorption of sodium ions to recover chromic acid for recycling as a plating liquor.

EXAMPLE

Chromium plating waste water containing 100 ppm of chromic acid, 0.8 ppm of sulfuric acid, and 8 ppm of iron was drawn from the primary washing tank 12, transferred into the neutralization tank 18 by way of the storage tank 16 for neutralization to pH 7 using aqueous sodium hydroxide solution, and further transferred into the primary filtrate tank 24a after the removal of precipitates through the filter 22. The filtrate thus obtained was then allowed to pass through the supplementary cylinder 50 which had been packed with 100 ml. of strongly basic OH type anion resins at a speed of 3 l./h., and the composition of the effluent from the supplementary cylinder 50 was found to be as follows.

|  |  |
|---|---|
| $Cr^{+6}$ | 0.3 ppm |
| Fe | Trace |
| $H_2SO_4$ | Trace |

The effluent was therefore transferred into the secondary filtrate tank 24b and further to the secondary water recovery tank 34 to be utilized as washing water. When the supplementary cylinder 50 had been used for 22 h., the chromic acid leakage exceeded 2 ppm, and thus the recycle into the secondary water recovery tank 34 was stopped; the effluent was pumped from the secondary filtrate tank 24b into the pretreatment tower side 26a and 26b for treatment through the adsorption towers 30a and 30b and purification tower 40. Further, after passing the solution through the supplementary cylinder 50 for 42 h., the chromic acid leakage reached the level of that in the filtrate in the primary filtrate tank 24a before treatment, and thus the supplementary cylinder 50 was switched into the regeneration cycle; after air purging, 100 ml. of an aqueous solution of sodium hydroxide of 150 g./l. concentration was added and purged at a speed of 0.2 l./h. for 30 min. and then air purging was applied for the regeneration of the resins. The regeneration effluent was sent to the primary solution recovery tank 38 and further to the purification tower 40 together with the regeneration effluent from the adsorption towers 30a and 30b for the recovery of chromic acid. The composition of the regeneration effluent from the above supplementary cylinder 50 was found to be,

|  |  |
|---|---|
| $CrO_3$ | 69 g./l. |
| $H_2SO_4$ | 0.76 g./l. |
| NaOH | 150 g./l. |

Figure 3:
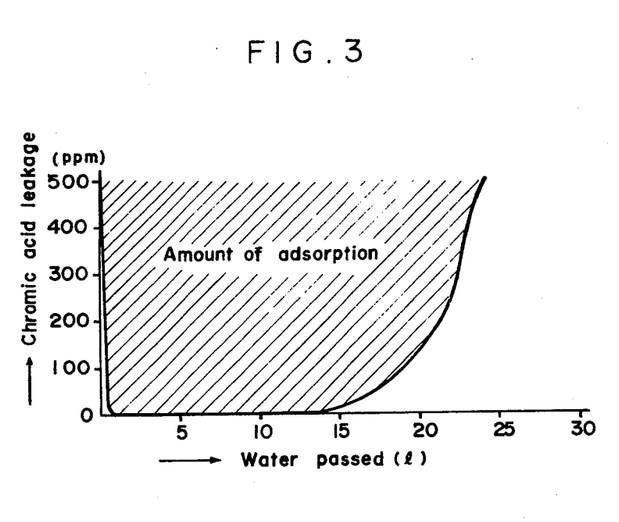
FIG. 3 represents the relationships between the amount of chromic acid eluted and the amount of solution passed for an example of FIG. 2.
Figure 4:
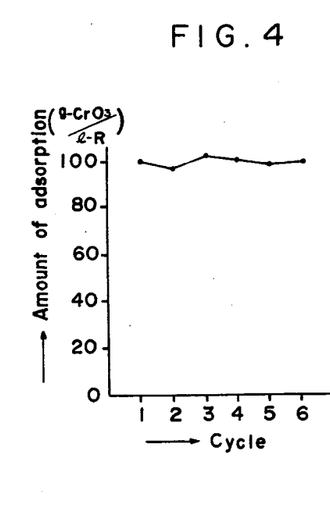
FIG. 4 represents the amount of chromic acid ion adsorbed in each of the repeated cycles of adsorption and regeneration.

The filtrate in the primary filtrate tank 24a was allowed to pass through the supplementary cylinder 50 after the above regeneration treatment which was carried out without washing with water, and after using the first 100 ml. of the treated solution for neutralization in the neutralization tank 18, the same treatments as described were repeated. The relationship between the leakage of chromic acid and the volume of solution passed through was measured, yielding the results shown in FIG. 3. Thus it became evident that, although at the beginning of the flow, a high concentration of chromic acid was leaking into the effluent, the adsorption of chromic acid subsequently become effective without posing any problems. The amounts of chromic acid adsorbed was determined in each of the cycles, as indicated in FIG. 4, showing that the activity of the anion resins remained essentially unchanged.

According to the above results of the second process, the volume of chromium plating waste water which passes through the supplementary cylinder 50 accounts for 80–90% of the total and can be re-used as washing water as such, indicating that the volume of chromium plating waste water which passes through the pretreatment towers 26a and 26b and the adsorption towers 30a and 30b accounts for only 10–20% of the total. Thus, when the concentration of the chromic acid in the chromium plating waste water is high, and further, when the volume of waste water is large, the resin volume required in the pretreatment towers 26a and 26b and the adsorption towers 30a and 30b is small and the cycle time can be extended. For regeneration, water washing is not necessary, thus reducing the amount of water used, simplifying the regeneration treatment as well as the equipment, and at the same time, reducing the regeneration time to about ¼–1/6 of that when using the adsorption tower. Moreover, the supplementary cylinder 50 is small in size as compared with the adsorption towers; since the effluent from this supplementary cylinder 50 is rich in alkaline components, it can be utilized effectively as washing water, and even a slight leakage of chromic acid from the supplementary cylinder 50 does not disturb the overall processes, thus making the automated operation of the treatment of chromium plating waste water possible by using a timer.

Figure 5:
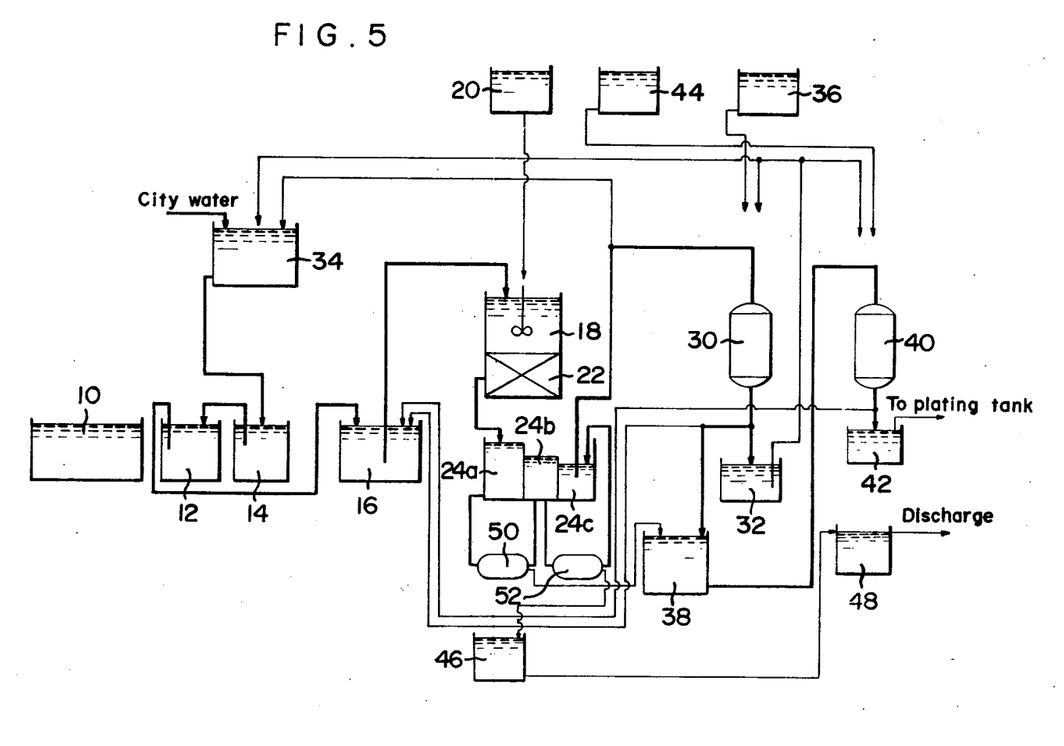
FIG. 5 represents a flow diagram for a further embodiment of the invention.

In the third process shown of the example in FIG. 5, the filtrate tank is divided into three parts: the primary filtrate tank 24a, the secondary filtrate tank 24b, and tertiary filtrate tank 24c; the filtrate in the primary filtrate tank 24a is allowed to pass through the supplementary cylinder 50 packed with strongly basic OH type anion resins so as to adsorb chromic acid ions, and the effluent is transferred into the secondary filtrate tank 24b. This filtrate in the secondary filtrate tank 24b is then allowed to pass through the supplementary cylinder 52 packed with strongly acids H type cation resins so as to remove sodium ions, and the effluent is transferred into the tertiary filtrate tank 24c. The solution in the tertiary filtrate tank 24c is sent to the secondary water recovery tank 34 and is supplied to the secondary washing tank 14, as described, for recycling as washing water. When the secondary water recovery tank 34 is filled up or the solution in the tertiary filtrate tank 24c is no longer usable as washing water, the solution in this tertiary filtrate tank 24c is sent to the adsorption tower side 30 to recover chromic acid, as in the case of the first process, via the adsorption tower 30 and the purification tower 40.

When the anion resins in the supplementary cylinder 50 become saturated with chromic acid and chromic acid starts to leak out, it is switched into the regeneration cycle for direct regeneration, without washing with water, using an aqueous sodium hydroxide solution of 150 g./l. concentration supplied from the caustic soda tank 36; the sodium chromate solution eluted therefrom is stored in the primary solution recovery tank 38 and is allowed to pass through the purification tower 40 together with regeneration effluent from the adsorption tower 30 to obtain concentrated chromic acid solution by the adsorption of sodium ions. While the supplementary cylinder 50 is being regenerated, the excess solution from the primary filtrate tank 24a is allowed to overflow into the secondary filtrate tank 24b; as soon as regeneration of the supplementary cylinder is completed, the solution in the primary filtrate tank 24a is allowed to pass through the resins without prior washing with water. Also, when the supplementary cylinder 52 is saturated, regeneration is effected, without washing with water, by treatment with sulfuric acid of 100 g./l. concentration which comes directly from the sulfuric acid tank 44 followed by washing with the solution in the primary water recovery tank 32; these effluents are transferred into the pH adjusting tank 48 via the waste sulfuric acid tank 46, and discarded after adjusting the pH.

EXAMPLE

When the chromic acid level of the solution in the primary washing tank 12 reached 30 ppm, it was passed to the neutralization tank 18 via the storage tank 16, neutralized by the addition of an almost equivalent amount of aqueous sodium hydroxide solution, and the mixture transferred into the primary filtrate tank 24a after the removal of precipitates by means of the filter 22. The filtrate was then allowed to pass through the supplementary cylinder 50 packed with 100 ml. of strongly basic OH type anion resins at a speed of 3 l./h. and the effluent was led into the secondary filtrate tank 24b; the filtrate was further allowed to pass through the supplementary cylinder 52 packed with 100 ml. of strongly basic H type cation resins, and the effluent was led into the tertiary filtrate tank 24c. The concentration of the chromic acid in the effluent from the supplementary cylinder 52 was reduced to below 0.3 ppm. Thus the solution in the tertiary filtrate tank 24c was transferred, as such, into the secondary water recovery tank 34 for recycling as washing water.

The above treatments were continued for 10 h. per day and it was found the amount of chromic acid leaking from the supplementary cylinder 50 exceeded 2 ppm on the 7th day; the supplementary cylinder was then switched into the regeneration cycle, the solution in the primary filtrate tank 24a was allowed to overflow into the secondary filtrate tank 24b, the recycled flow from the tertiary filtrate tank 24c into the secondary water recovery tank 34 was switched to the adsorption tower side 30, and treatment was effected through this adsorption tower 30 and purification tower 40. In this case, the chromic acid concentration in the effluent from the adsorption tower 30 was below 0.1 ppm.

Immediately after regeneration of the supplementary cylinder 50 as described in the second method, which was carried out without water washing, the solution in the primary filtrate tank 24a was allowed to pass through. When the supplementary cylinder 52 was saturated, 150 ml. of sulfuric acid solution of 100 g./l. concentration supplied from the sulfuric acid tank 44 was allowed to flow therethrough for a period of 20 min., and for water washing after this regeneration, the solution in the primary water recovery tank 32, which was effluent from the adsorption tower 30, was utilized.

Thus, in this third method, the advantages described in the second method are not sacrificed and yet advantageously, the pretreatment tower is no longer needed, since the sodium ions in the filtrate are adsorbed in the supplementary cylinder 52 and the resulting acidic filtrate is sent to the adsorption tower side 30 for further treatment.

Figure 6:
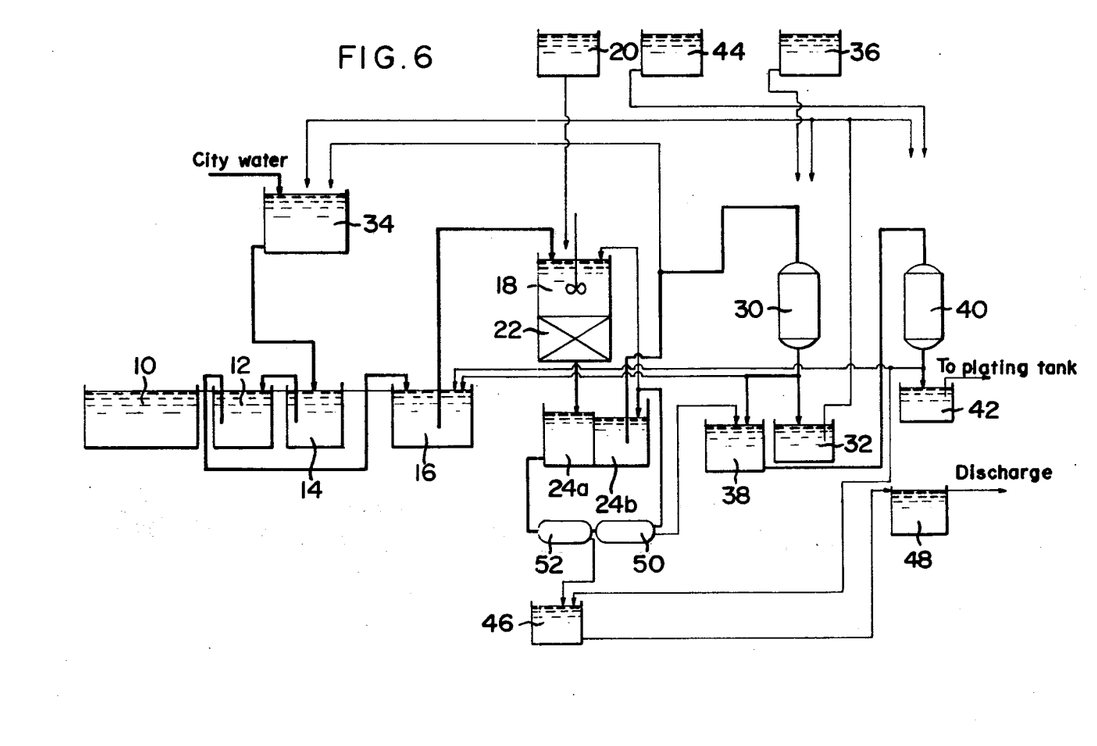
FIG. 6 represents a flow diagram for still another embodiment of the invention.

In each of the second and third methods described above, the filtrate from the filter 22 is first sent to the supplementary cylinder 50 packed with strongly basic OH type anion resins to adsorb chromic acid ions. Thus, in those methods, when the chromic acid concentration in the chromium plating waste water exceeds a certain level, the adsorption of chromic acid in the supplementary cylinder 50 becomes insufficient due to the neutrality of the filtrate in the primary filtrate tank 24a. In such cases, a supplementary cylinder 52 packed with strongly acidic H type cation resins is installed before the supplementary cylinder 50 packed with strongly basic OH type anion resins in series, as in the fourth method shown in the example of FIG. 6, so as to make the solution acidic through adsorption of sodium ions in the filtrate before the treatment in supplementary cylinder 50 for the adsorption of chromic acid ions; in this method particularly the sodium ions in the filtrate are adsorbed in the supplementary cylinder 52, thus making the elimination of the pretreatment tower possible, as in the case of the third method, and further, the adsorption capacity for chromic acid ions in the supplementary cylinder 50 is improved, thus advantageously reducing the volume of the resins in the adsorption tower 30.

What is claimed is:

1. A method of recycling chromium plating waste water which contains dissolved chromium and dissolved base metals which are precipitatable, by adjustment of pH to a range of approximately 7 to 9, comprising the steps of adjusting the pH of the chromium plating waste water to a range of approximately 7 to 9 and thereby precipitating said dissolved metals from said waste water while the chromium remains in solution in said waste water;

contacting at least one portion of the resulting liquid with an acidic cation exchange resin in the free acid form so as to lower the pH and obtain a dichromic acid-containing solution;

adsorbing dichromate ions from said solution with an anion exchange resin;

desorbing adsorbed dichromate ions from said anion exchange resin so as to obtain an effluent chromium-containing solution; and recycling said solution to a chromium-plating bath.

2. A method as defined in claim 1, further comprising the step of regenerating at least said cation exchange resin with an acidic medium.

3. A medium as defined in claim 2, wherein said acidic medium comprises a substance selected from the group consisting of sulfuric acid and hydrochloric acid.

4. A method as defined in claim 1, wherein said desorbing step is carried out with an alkaline medium.

5. A method as defined in claim 4, wherein said alkaline medium comprises an aqueous solution of sodium hydroxide.

6. A method as defined in claim 1, wherein said adjusting step comprises adding an alkaline medium to said waste water.

7. A method as defined in claim 6, wherein said alkaline medium comprises a substance selected from the group consisting of sodium hydroxide and calcium hydroxide.

8. A method as defined in claim 1; and further comprising the step of separating said waste water and the precipitate of said metals prior to the contacting step.

9. A method as defined in claim 1, said liquid comprising chromium in the form of $CrO_4^{--}$ ions prior to said contacting step; and wherein said contacting step comprises lowering the pH of said one portion of said liquid to a value at which the $CrO_4^{--}$ ions are substantially all converted to $Cr_2O_7^{--}$ ions.

10. A method as defined in claim 1; further comprising the steps of adsorbing said dissolved chromium from another portion of said liquid which has a pH in approximately said range; and desorbing chromium adsorbed from said other portion of said liquid so as to obtain another effluent chromium-containing solution.

11. A method as defined in claim 10, wherein the step of desorbing chromium adsorbed from said other portion of said liquid is carried out with an alkaline medium.

12. A method as defined in claim 11, wherein said alkaline medium comprises an aqueous solution of sodium hydroxide.

13. A method as defined in claim 10, wherein at least one of said desorbing steps is carried out with an alkaline medium; further comprising the step of combining said effluent solutions.

14. A method as defined in claim 10, wherein said contacting and adsorbing steps for said one portion of said liquid are carried out only during the step of desorbing chromium adsorbed from said other portion of said liquid.

15. A method as defined in claim 10, wherein said adjusting step comprises adding an alkaline medium to said waste water; further comprising the step of adsorbing cations introduced into said liquid by said medium from said other portion of said liquid subsequent to the step of adsorbing dissolved chromium therefrom.

16. A method for the treatment of chromium plating waste water, which contains dissolved chromium and dissolved base metals which are precipitatable by adjustment of pH to a range of approximately 7 to 9, comprising the steps of adjusting the pH of said chromium plating waste water to a range of approximately 7 to 9 by adding a substance selected from the group consisting of sodium hydroxide and calcium hydroxide to said waste water so as to effect precipitation of said dissolved metals from said waste water as hydroxides while maintaining said chromium in solution in said waste water and so as to introduce ions selected from the group consisting of sodium and calcium ions into said waste water;

adsorbing at least some of said ions from at least one portion of the resulting liquid by contacting said one portion of said liquid with at least one acidic cation exchange resin so as to acidify said one portion of said liquid and obtain a dichromic acid-containing solution;

adsorbing dichromate ions from said solution by contacting said solution with at least one anion exchange resin;

desorbing adsorbed dichromic ions by contacting said anion exchange resin with an aqueous solution of sodium hydroxide thereby obtaining at least one effluent chromium-containing solution which includes sodium ions;

adsorbing sodium ions from said one effluent solution by contacting the latter with a cation exchange resin in free acid form so as to obtain another chromium-containing solution; and regenerating said cation exchange resins by contacting the latter with a substance selected from the group consisting of sulfuric acid and hydrochloric acid.

17. A method as defined in claim 16; further comprising the steps of adsorbing dissolved chromium from another portion of said liquid, which has a pH in approximately said range, by contacting said other portion of said liquid with a strongly basic OH type anion exchange resin;

recycling at least part of said other portion of said liquid for washing of plated articles subsequent to the step of adsorbing dissolved chromium therefrom;

desorbing adsorbed chromium from said strongly basic anion exchange resin by contacting the latter with an aqueous solution of sodium hydroxide thereby at least in part regenerating said strongly basic anion resin and obtaining another effluent chromium-containing solution which includes sodium ions; and combining said effluent solutions prior to the step of adsorbing sodium ions from said one effluent solution, said one portion of said liquid being contacted with said acidic resin and said one anion exchange resin only during regeneration of said strongly basic anion resin.

18. A method for the recycle treatment of chromium plating waste water which contains dissolved chromium and dissolved base metals which are precipitatable by adjustment of pH to a range of approximately 7 to 9, comprising the steps of adjusting the pH of said chromium plating waste water to a range of approximately 7 to 9 by adding a substance selected from the group consisting of sodium hydroxide and calcium hydroxide to said waste water so as to effect precipitation of dissolved metals from said waste water as hydroxides while maintaining chromium in solution in said waste water and so as to introduce ions selected from the group consisting of sodium and calcium ions into said waste water;

adsorbing dissolved chromium from at least one portion of the resulting liquid by contacting said one portion of said liquid with a strongly basic OH type anion exchange resin;

adsorbing at least some of said ions from said one portion of said liquid subsequent to the step of adsorbing dissolved chromium therefrom by contacting said one portion of said liquid with a strongly acidic H type cation exchange resin;

recycling at least part of said one portion of said liquid for washing of plated articles subsequent to the step of adsorbing ions therefrom;

desorbing adsorbed chromium from said strongly basic anion exchange resin by contacting the latter resin with an aqueous solution of sodium hydroxide thereby at least in part regenerating said strongly basic anion exchange resin and obtaining at least one effluent chromium-containing solution which includes sodium ions;

adsorbing at least some of the ions of said group of ions from another portion of said liquid, which has a pH in approximately said range, during regeneration of said strongly basic anion exchange resin by contacting said other portion of said liquid with said strongly acidic cation resin thereby acidifying said other portion of said liquid and obtaining a dichtromic acid-containing solution;

adsorbing dichromate ions from said dichromic acid-containing solution with another anion exchange resin;

desorbing adsorbed dichromate ions from said other anion exchange resin by contacting the latter with an aqueous solution of sodium hydroxide thereby obtaining another effluent chromium-containing solution which includes sodium ions, said cation exchange resins all being in free acid form;

combining said effluent solutions; and adsorbing sodium ions from the combined effluent solutions by contacting the latter with another cation exchange resin in free acid form.

19. A method for the recycle treatment of chromium plating waste water which contains dissolved chromium and dissolved base metals which are precipitatable by adjustment of pH to a range of approximately 7 to 9, comprising the steps of adjusting the pH of chromium plating waste water to a range of approximately 7 to 9 by adding a substance selected from the group consisting of sodium hydroxide and calcium hydroxide to said waste water so as to effect precipitation of dissolved metals from said waste water as hydroxide while maintaining chromium in solution in said waste water and so as to introduce ions selected from the group consisting of sodium and calcium ions into said waste water;

adsorbing at least some of said ions from at least one portion of the resulting liquid by contacting said one portion of said liquid with a strongly acidic H type cation exchange resin thereby acidifying said one portion of said liquid and obtaining dichromic acid-containing solution;

adsorbing dichromate ions from said solution by contacting said solution with a strongly basic OH type anion exchange resin;

recycling said solution for washing of plated articles subsequent to the step of adsorbing dichromate ions therefrom;

desorbing adsorbed dichromate ions from said strongly basic anion exchange resin by contacting the latter with an aqueous solution of sodium hydroxide thereby at least in part regenerating said strongly basic anion exchange resin and obtaining at least one effluent chromium-containing solution which includes sodium ions;

adsorbing dissolved chromium from another portion of said liquid, which has pH in approximately said range, during regeneration of said strongly basic anion resin by contacting said other portion of said liquid with another anion exchange resin;

desorbing adsorbed chromium from said other anion exchange resin by contacting the latter with an aqueous solution of sodium hydroxide thereby obtaining another effluent chromium-containing solution which includes sodium ions;

combining said effluent solutions; and adsorbing sodium ions from the combined effluent solutions by contacting the latter with another cation exchange resin.

* * * * *